United States Patent [19]

Motose

[11] Patent Number: 5,111,132
[45] Date of Patent: May 5, 1992

[54] BATTERY CHARGING SYSTEM FOR MARINE PROPULSION UNIT

[75] Inventor: Hitoshi Motose, Hamamatsu, Japan

[73] Assignee: Sanshin Kogyo Kabushiki Kaisha, Hamamatsu, Japan

[21] Appl. No.: 510,516

[22] Filed: Apr. 18, 1990

[30] Foreign Application Priority Data

Apr. 18, 1989 [JP] Japan .................................. 1-96484

[51] Int. Cl.⁵ .............................................. H02J 7/14
[52] U.S. Cl. ........................................ 322/90; 320/15; 320/57; 322/91
[58] Field of Search ...................... 320/15, 57; 322/90, 322/91

[56] References Cited

U.S. PATENT DOCUMENTS

| | | | |
|---|---|---|---|
| 2,998,776 | 9/1961 | Morgan | 320/15 X |
| 3,991,358 | 11/1976 | Tashiro et al. | 322/91 X |
| 4,214,198 | 7/1980 | Schneider | 320/15 |

Primary Examiner—R. J. Hickey
Attorney, Agent, or Firm—Ernest A. Beutlzer

[57] ABSTRACT

A charging system for charging plural batteries from a generating coil without requiring a separate isolator to protect the circuit in the event of battery failure. The circuit includes a rectifying diode circuit including a plurality of parallel diode paths between the ends of generating coil and the terminals of the battery. There are a number of diode circuits at least equal to the number of batteries.

3 Claims, 3 Drawing Sheets

BATTERY CHARGING SYSTEM FOR MARINE PROPULSION UNIT

BACKGROUND OF THE INVENTION

This invention relates to a battery charging system for a marine propulsion unit and more particularly to an improved arrangement for charging a pair of batteries from an alternator.

In many applications a storage battery is employed for powering electrical devices and this storage battery is charged by an alternator driven by an internal combustion engine. A wide variety of vehicles including watercraft incorporates such systems. Frequently it is also the procedure to employ plural batteries that are wired in parallel so as to provide safety and insurance against a loss of power even in the event one battery becomes depleted. However, when both batteries are charged in parallel, it has been the practice to provide a battery isolator between the rectifying diode circuit and the batteries so as to protect the circuit and other battery in the event one of the batteries becomes defective. Such isolators are normally provided in a separate circuit between the rectifying diodes and the batteries as a separate connector or isolator that includes a plurality of diodes, one being connected to each of the batteries. Such arrangements, however, are unsatisfactory for a variety of reasons.

Specifically, the provision of the separate battery isolator further complicates the wiring and obviously adds to its cost. In addition, the fact that the diodes are added elements to the system give rise to a drop in voltage which lowers the charging performance of the system.

FIGS. 1 and 2 are views showing an outboard motor charging a pair of batteries and the electrical circuitry therefore, respectively, of a prior art construction. It will be noted that an outboard motor 11 has a combined magneto generator system including a flywheel 12 that includes a generating coil 13. The generating coil 13 supplies electrical power to a terminal 14 through a charging circuit, indicated generally by the reference numeral 15. This charging circuit 15 includes a voltage regulator 16 which is associated with a pair of diodes 17 on the opposite ends of the charging coil 13 and a rectifying circuit including pairs of diodes 19 and 21 that output a generally constant direct current voltage to the terminal 14.

A pair of batteries 22 have one of their terminals (in this case the positive terminal) in circuit with the terminal of 15 through a parallel circuit that includes an isolator 23. As may be seen, the isolator 23 includes a pair of diodes 24 that are in parallel circuit and which will protect one battery 22 in the event the other battery becomes defective. As afore described, the isolator 23 not only adds to the complexity and cost of the device but also the diodes 24 act to reduce the charging efficiency.

It is, therefore, a principal object to this invention to provide an improved arrangement for charging plural batteries from a magneto generator or alternator.

It is a further object of this invention to provide a charging circuit for charging a plurality of batteries wherein the use of a separate electrical isolator to protect the remaining battery or batteries in the event of a defective battery is unnecessary.

SUMMARY OF THE INVENTION

This invention is adapted to be embodied in a charging circuit for charging a plurality of batteries from a generating coil subject to reversing current flow. In accordance with the invention, a rectifying diode circuit is placed in circuit between the generating coil and the batteries and has a plurality of diodes interposed in parallel circuits between the coil and the batteries. The parallel diode circuits are at least equal in number to the number of batteries.

DETAILED DESCRIPTION OF THE PREFERRED EMBODIMENTS OF THE INVENTION

Figure 1:
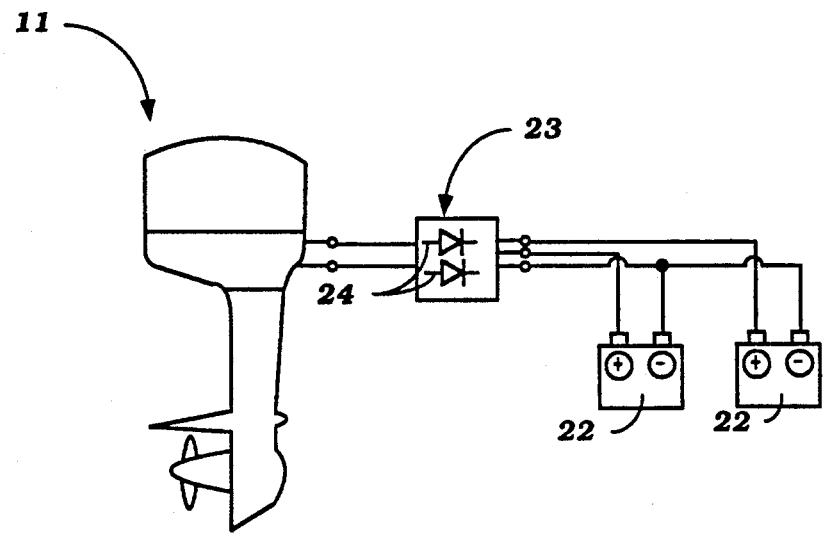
FIG. 1 is a partially schematic side elevational view of an outboard motor charging a plurality of batteries in accordance with a prior art construction.
Figure 2:
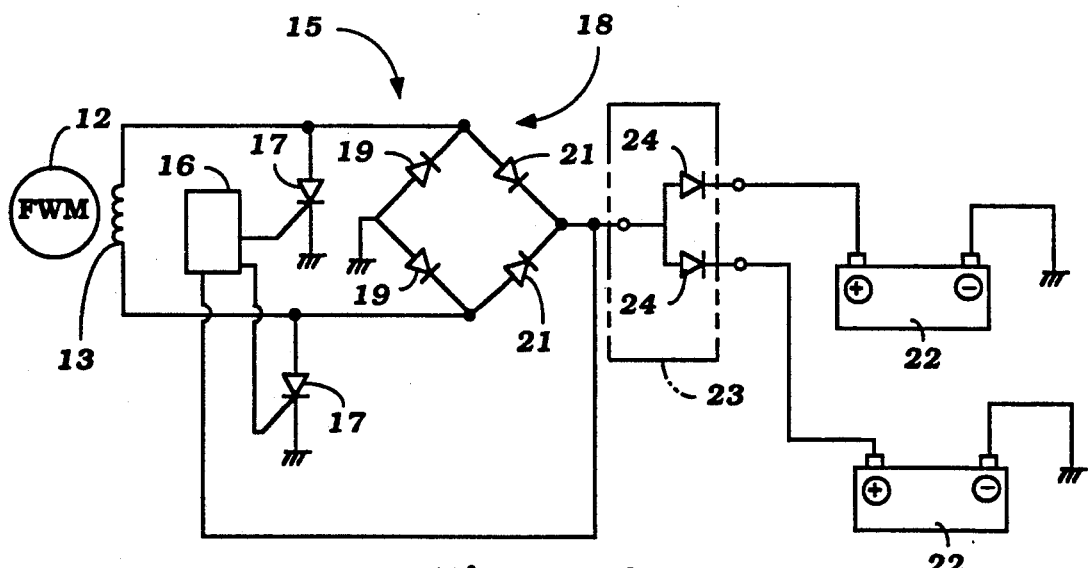
FIG. 2 is a schematic electrical diagram of the prior art construction shown in FIG. 1.
Figure 3:
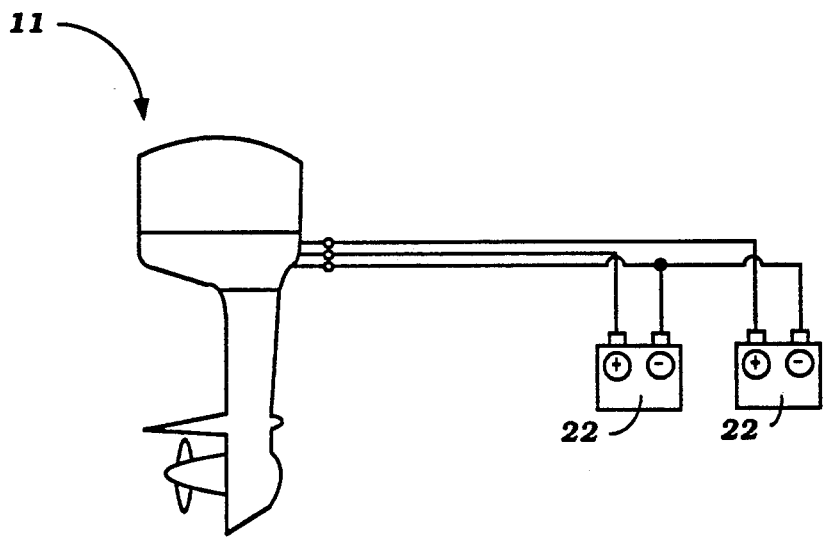
FIG. 3 is a partially schematic side elevational view of a system for charging a plurality of batteries from an outboard motor in accordance with an embodiment of the invention.
Figure 4:
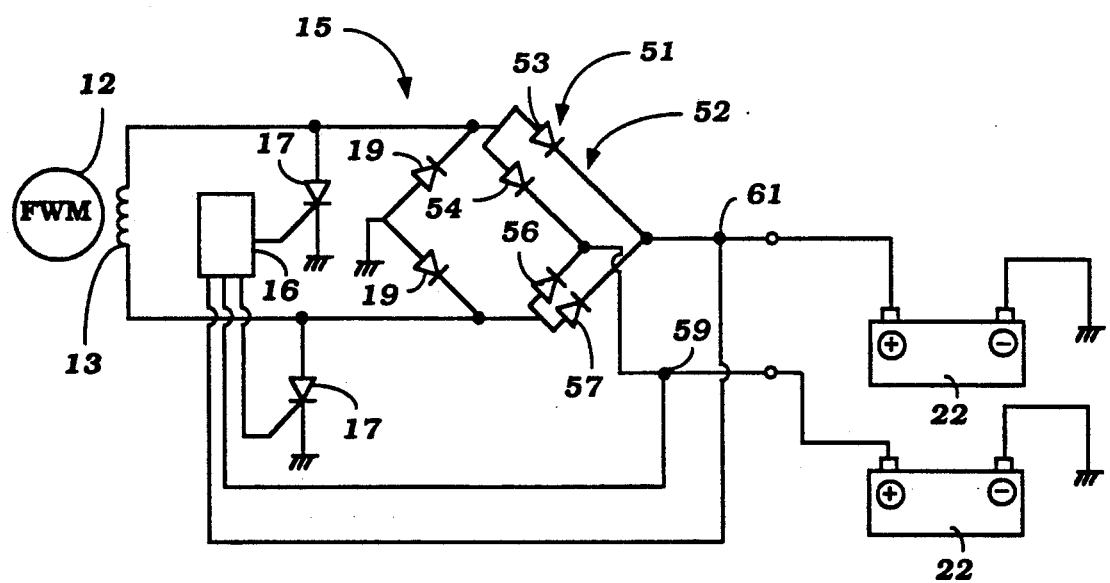
FIG. 4 is a schematic view showing the electrical circuitry of this embodiment.

Referring first to FIGS. 3 and 4, those components of the invention which are the same or substantially the same as the prior art construction have been identified by the same reference numerals and will be described again only in so far as is necessary to understand the construction and operation of this embodiment. In this embodiment, the ground diodes 19 of a rectifying circuit, indicated generally by the reference numerals 51 are the same but are in circuit with a parallel diode system, indicated generally by the reference numeral 52 that includes parallel diodes 53 and 54 in circuit with a common terminal 55 that extends from one side of the coil 13. In addition, a pair of parallel diodes 56 and 57 are in circuit with a common terminal 58 from the other side of the coil. The diodes 54 and 56 are in circuit with a terminal 59 that extends to the positive side of one of the batteries 22 and also to the voltage regulator 16. In a like manner, the diodes 53 and 57 are in circuit with a terminal 61 which is connected to the positive terminal of the remaining battery 22 of the pair of charged batteries. Because of this arrangement, the separate isolator is not required since the isolating function is provided by the diode pairs themselves are also there will be no loss in voltage to charge the batteries 22 because each has, in effect, its own rectifying circuit.

In the embodiment as thus far described, the system has been disclosed in conjunction with an arrangement wherein a pair of batteries are to be charged. It should be readily apparent that the arrangement can be utilized when more than two (2) batteries are charged as long as the number of parallel diode circuits is equal to the number of batteries being charged.

Figure 5:
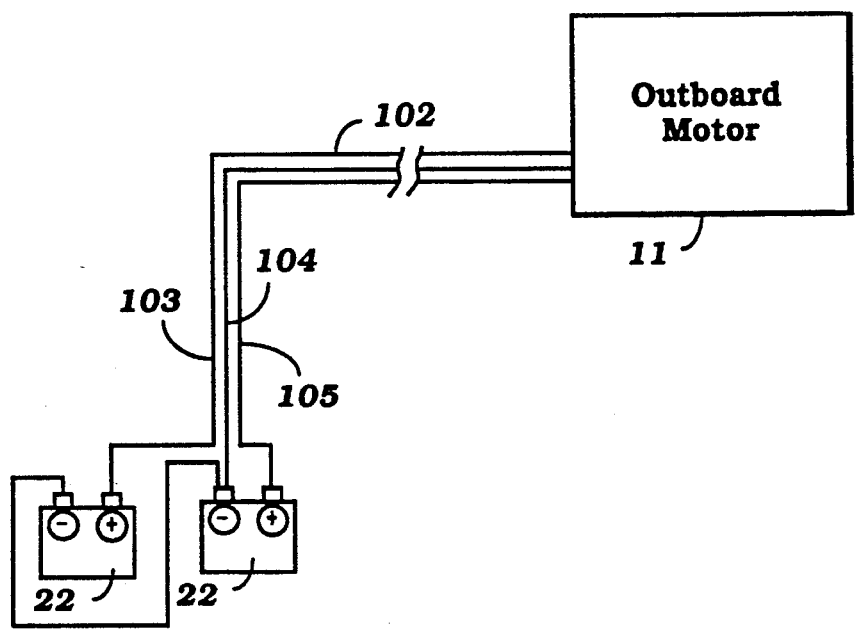
FIG. 5 is a schematic plan view showing the charging system incorporating an electrical cable constructed in accordance with another feature of the invention.
Figure 6:
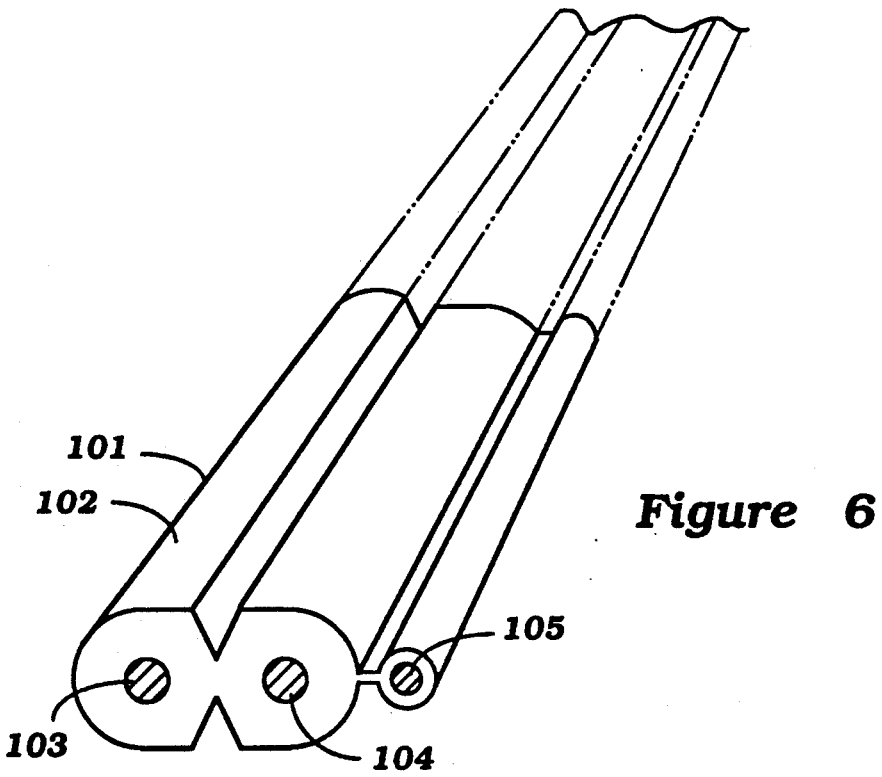
FIG. 6 is an enlarged view of the electrical cable broken to show the interior construction.

In accordance with the invention, it will be noted that the wiring between the outboard motor 11 and the batteries 22 can be simplified by utilizing a charging cable, as shown in FIG. 5 and 6 and identified generally by the reference numeral 101. The charging cable 101 has an electrical insulator 102 in which three (3) conductors 103, 104 and 105 are contained. Such a three cable conductor 101 further simplifies the overall construction and avoids the necessity for separate pairs of cables. It more than two (2) batteries are employed, additional conductors may be provided within a common insulator.

It should be readily apparent from the foregoing description that a very effective charging system is provided for charging plural batteries and for isolating those batteries from each other in the event one of them becomes defective without requiring a separate isolator or the power losses accompanied by such isolators. Although embodiments of the invention have been illustrated and described, various changes and modifications may be made without departing from the spirit and scope of the invention, as defined by the appended claims.

I claim:

1. A charging system for charging a plurality of batteries, a rotating permanent magnet generating coil subject to a reversing current flow said charging system comprising a rectifying diode circuit positioned between the ends of the generating coil and the batteries, said diode circuit comprising a plurality of parallel diode circuit paths, each of said parallel diode circuit paths connecting a respective end of said generating coil with a respective terminal of each battery, said parallel diode circuits being equal in number to the number of batteries, and regulating means for regulating the voltage applied from said coil to each of said parallel diode circuit paths.

2. A charging system as set forth in claim 1 wherein the diode circuits are wired so each diode serves only one of the batteries.

3. A charging system as set forth in claim 1 wherein the regulating means comprises shunt type regulators for regulating the voltage supplied from each end of the coil to each of the parallel diode circuits.

* * * * *